(No Model.)
G. H. REYNOLDS.
DEVICE FOR CONTROLLING THE OPERATION OF ELEVATORS.
No. 360,248. Patented Mar. 29, 1887.
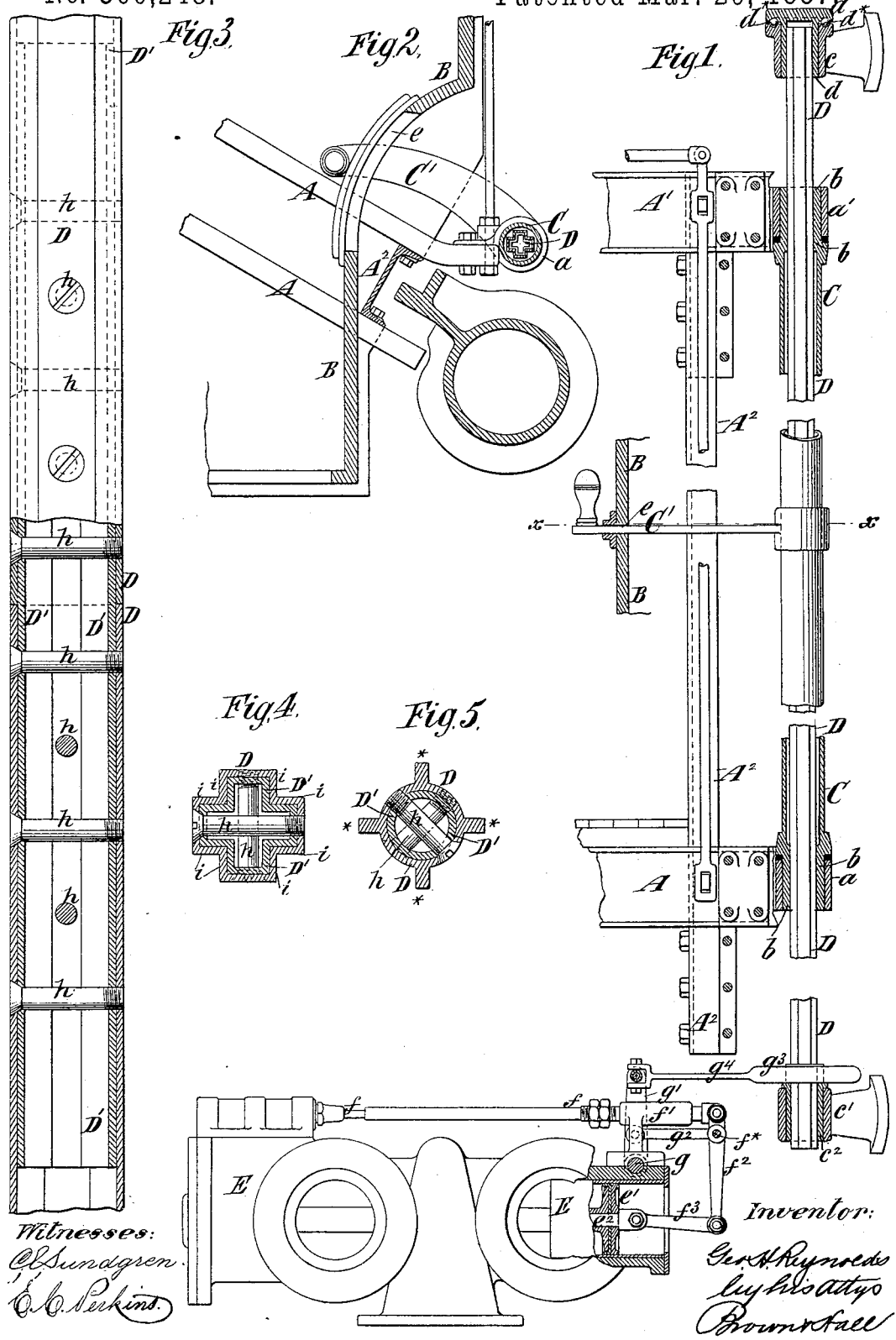

UNITED STATES PATENT OFFICE.

GEORGE H. REYNOLDS, OF NEW YORK, N. Y., ASSIGNOR OF ONE-HALF TO CRANE BROTHERS MANUFACTURING COMPANY, OF CHICAGO, ILL.

DEVICE FOR CONTROLLING THE OPERATION OF ELEVATORS.

SPECIFICATION forming part of Letters Patent No. 360,248, dated March 29, 1887.

Application filed November 4, 1884. Serial No. 147,164. (No model.)

*To all whom it may concern:*

Be it known that I, GEORGE H. REYNOLDS, of the city and county of New York, in the State of New York, have invented a new and useful Improvement in Devices for Controlling the Operation of Elevators, of which the following is a specification.

In my pending application, Serial No. 144,001, filed September 25, 1884, I have shown, as a means of shifting the valve which controls the rising and falling movements of the elevator car or cage, a vertical shaft or rod arranged in the elevator-shaft at the side of or through the car, and a handle in the car which occupies a stationary position relatively to the car as the latter moves, and by which the shaft or rod may be turned to shift the valve which is connected with its lower end.

My present invention consists in combinations of parts hereinafter described, and pointed out in the claims, and which include a vertical rod or shaft of novel construction.

In the accompanying drawings, Figure 1 is an elevation, partly in section, of a part of a car, a valve for a hydraulic elevator, and devices embodying my invention for shifting the valve, and including a rod or shaft consisting of a single suspended tube. Fig. 2 is a horizontal section on the plane of the dotted line $x\ x$, Fig. 1. Fig. 3 is a partly sectional elevation, on a much larger scale, of a portion of a rod or tube made in the form of a Greek cross in its transverse section. Fig. 4 is a transverse section of the rod or tube on the same scale as Fig. 3; and Fig. 5 is a section, similar to Fig. 4, of a rod or tube of circular form, having external ribs or tongues.

Similar letters of reference designate corresponding parts in all the figures.

I will first describe my invention as illustrated in Figs. 1 and 2.

As the cage and car form no part of my invention, I have only illustrated portions of them. They may be of any suitable or well-known construction. The bottom and top portions A A' of the cage and the uprights $A^2$ connecting them, one only of which is shown, may be of channel-bars, as is shown and described in my application for Letters Patent, Serial No. 143,524, filed September 20, 1884.

In the cage is supported the car B, a part of which is shown in Fig. 2. On the outside of the car are bearings $a\ a'$, attached to the bottom and top portions thereof, and in these bearings and outside the car is supported a sleeve, C, which, as here shown, extends the full length of the car, but may be of any less length, and which is free to turn in said bearings.

D designates the vertical rod or shaft which is suspended in the elevator-shaft, and is received through the sleeve C. This rod or shaft, as here shown, consists of a single tube which is of the transverse section shown in Fig. 4, and hereinafter described, but which may be square or of other form. As the car rises and falls the sleeve C slides freely on the rod D, but they are locked together, so that any turning movement of the sleeve is transmitted to the rod or shaft. The portions $b$ of the sleeve near the ends thereof are fitted or locked to the rod or shaft D. At the top of the elevator-shaft is a bracket, $c$, and the top of the rod or shaft D is secured in a head or bush, $d$, having a cylindric exterior fitted to a bearing in the bracket and free to turn therein. The head or bush $d$ has an outwardly-projecting flange, $d'$, under which are placed spheres $d^*$, which constitute friction-rollers and allow the rod or shaft to turn with little friction. At the bottom of the elevator-shaft is a bracket, $c'$, and the lower end of the rod or shaft D is fitted to a bush or sleeve, $c^2$, which may turn freely in a bearing in said bracket. This lower bearing serves simply to prevent lateral movement or side-play of the lower end of the said rod or shaft D, and as the weight thereof is all supported by the upper bearing the rod or shaft will hang straight and will not tend to buckle, as would be the case were the weight supported by the lower bearing.

To the sleeve C is secured a handle, C', which projects through a horizontal slot, $e$, into the inside of the car B, and may be there shifted in a horizontal plane to turn the sleeve C and the rod or shaft D at any point in the travel of the car.

The valve here chosen to illustrate the operation of my invention is similar to that shown and described in my application for Letters Patent, Serial No. 147,253, filed November 6, 1884, and but a brief description thereof is necessary.

E designates a casing, wherein are a main valve and two controlling-pistons, one of which, $e'$, is shown in section upon a rod, $e^2$, and surmounting the casing E is an auxiliary valve operated through a rod or stem, $f$, which is guided in a bearing, $f'$. The rod or stem $f$ is connected by a lever and link or rod, $f^2 f^3$, with the piston-rod $e^2$. Supported in a fixed bearing is a rock-shaft, $g$, from which arms $g'$ extend upward; and the said arms $g'$ are connected between their ends by rods $g^2$ with the lever $f^2$ at a point, $f^*$, between the ends of the latter. So long as the auxiliary valve is operated automatically the point $f^*$ serves as a fulcrum, but when it is desired to shift the auxiliary valve independently of its automatic movement it is only necessary to swing the arms $g'$ in one or other direction.

The rod or shaft D may have an arm connected with the arms $g'$, but I have here shown an eccentric, $g^3$, on said rod or shaft, the strap of which is connected by a rod, $g^4$, with the arms $g'$. By a very slight movement of the handle C', requiring but little power, the auxiliary valve may be shifted to control the operation of the main valve.

The rod or shaft D is composed of abutting sections of tube. The abutting sections D D of tube have inserted into them, and lapping on each of them for a considerable distance, an inner tube, D', smaller in size but conforming in shape to the outer tube. The inner and outer tubes are then secured by screws $h$, inserted in directions at right angles to each other, as shown. These screws are inserted through the tubes at one side and are tapped into the other or opposite sides of the tubes. Rivets may be inserted in lieu of the screws, or the inner and outer tubes may be sweated together or secured by other means.

In Fig. 5 I have represented a round tube, D, as provided with external ribs, *, which may be formed integral therewith in the operation of drawing the tube. The abutting sections of outer tube may in this case also be united by an inner tube, D', of corresponding section, and the two secured by screws $h$, or rivets, as before described.

The tube D, having the form of a Greek cross in transverse section, as shown in Fig. 4, is very desirable, as the sides of the arms, being tangential to a circle of small diameter, offer broad faces $i$, on which the bearing portions $b$ of the sleeve C act, and the wear of both the sleeve and tube is thereby reduced and the sensitiveness and certainty of operation increased. The round tube D, with radial ribs *, (shown in Fig. 5,) has these same advantages.

The lever or hand-gear C' remains stationary relative to the car or cab as it moves up and down, and is positively connected with the valve by means of the suspended shaft, the sleeve fitting thereon, and the other connections herein described. This handle or lever is therefore distinguished by its stationary relation to the car or cab from any hand-wheel such as heretofore has been arranged to rotate in the car or cab as it rises and falls, and is arrested in its rotary movement by the attendant when it is desired to stop the car or cab, and said handle is also distinguished from an ordinary hand-rope along which the car or cab travels vertically.

What I claim as my invention, and desire to secure by Letters Patent, is—

1. The combination, with a valve for controlling the movement of an elevator-car, of a vertical shaft arranged in the elevator-shaft and connected at its lower end with the valve, the shaft being composed of tube-sections butted together and inner tube-sections conforming to the shape of the outer sections and lapping on the abutting ends thereof, and a sleeve and handle carried by the car, receiving the said shaft through the sleeve, and by which the shaft may be turned, substantially as herein described.

2. The combination, with a valve for controlling the movement of an elevator-car, of a vertical rod or shaft connected at its lower end with said valve and having the form of a Greek cross in transverse section, and a sleeve and handle carried by the car, receiving said rod or shaft through the sleeve, and by which the rod or shaft may be turned, substantially as herein described.

3. The combination, with a valve for controlling the movement of an elevator-car, of a shaft connected at the lower end with said valve and composed of inner and outer tube-sections conforming in shape, and lapping joints and screws or rivets inserted through the lapping portions of tube, and a handle and sleeve on the car, receiving the shaft through the sleeve, and by which the shaft may be turned, substantially as herein described.

4. The combination, with a valve for controlling the movements of an elevator-car, of a vertical shaft, D, composed of inner and outer lapping tube-sections and having the form of a Greek cross in transverse section, screws or rivets securing said lapping sections, connections between the lower end of the said shaft and valve, and a handle and sleeve carried by the car, and by which said shaft may be turned, substantially as herein described.

GEO. H. REYNOLDS.

Witnesses:
FREDK. HAYNES,
EMIL SCHWARTZ.